F. O. DESCHAMPS.
Omnibus Lamp.
No. 9,885.
Patented July 26, 1853.
Fig: 1.
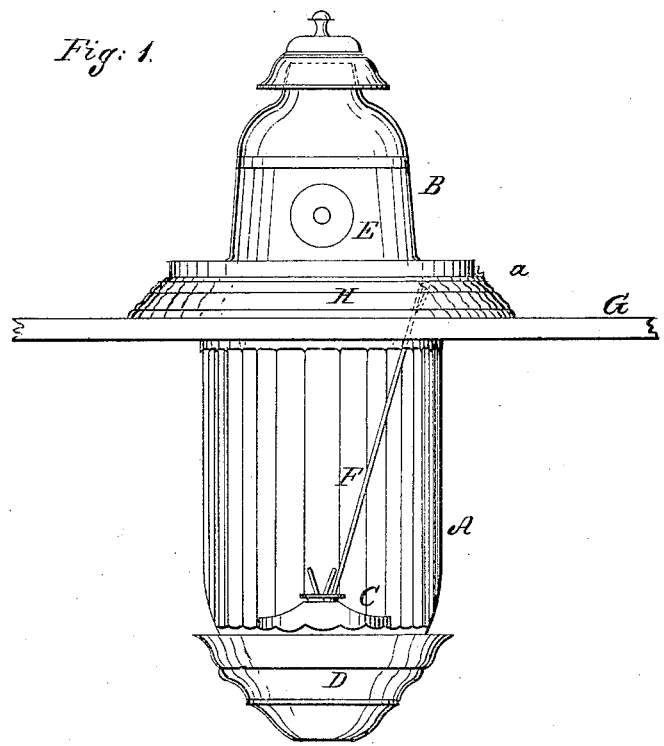
Fig: 2.
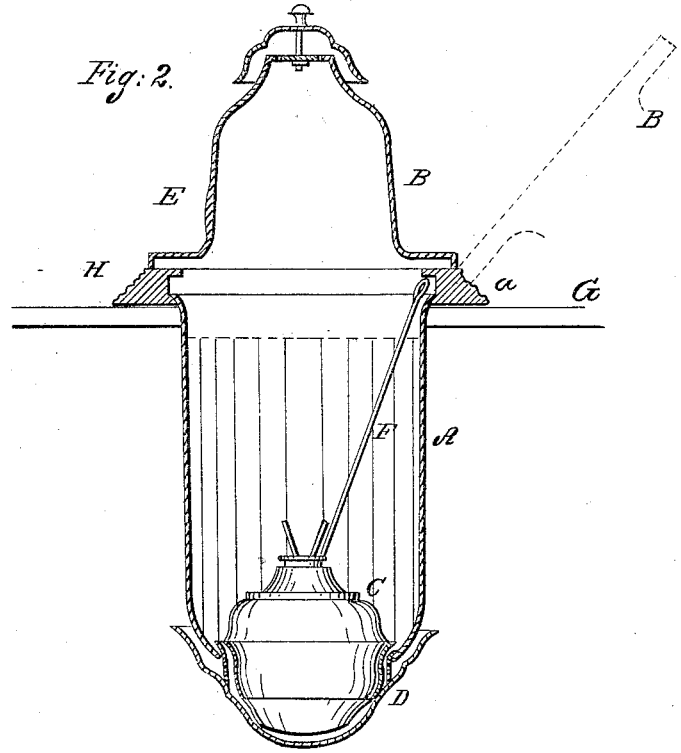

UNITED STATES PATENT OFFICE.

F. O. DESCHAMPS, OF PHILADELPHIA, PENNSYLVANIA.

OMNIBUS-LANTERN.

Specification of Letters Patent No. 9,885, dated July 26, 1853.

*To all whom it may concern:*

Be it known that I, F. O. DESCHAMPS, of the city and county of Philadelphia and State of Pennsylvania, have invented a new and Improved Lamp for Omnibuses, Stages, &c.; and I do hereby declare that the following is a full, clear, and exact description of the same, reference being had to the annexed drawings, making a part of this specification, in which—

Figure 1, is an external view of the lamp, in elevation. Fig. 2, is a vertical section of ditto, taken through the center.

Similar letters of reference indicate corresponding parts in each of the two figures.

The nature of my invention consists in placing the lamp within a case, the lower part of which is formed of glass, and the upper part of a metal cap, in which cap is placed a lens. The case is intended to be inserted in the top or roof of the omnibus or stage immediately behind the seat of the driver; the lower and glass portion being below the top or roof, and within the omnibus or stage, and the metal cap containing the lens above the top or roof. The lamp being in the lower part of the case, the light passes of course through the glass, and illuminates the interior of the omnibus or stage; while the metal cap above the top or roof concentrates the rays of light, and enables the driver to see distinctly the money-box, which is so placed that the light from the lens is thrown upon it. By this invention, the same lamp illuminates the interior of the omnibus, and also affords light to enable the driver to give the correct change from the money-box, when required.

To enable others skilled in the art to fully understand and construct my invention, I will proceed to describe it.

A, represents the lower and glass portion of the case; and B, is the metal cap which forms the upper part of the case. The metal cap is secured to the lower or glass portion of the case, by means of a hinge, *a*, C, is the lamp, which is placed at the lower part of the glass portion; the lamp fitting in a socket, D.

The metal cap, B, has a lens, E, inserted in it.

F, is a wire connected to the top of the lamp C; said wire extends upward to the top of the glass, A, and serves as a handle by which the lamp is taken from and adjusted in its socket, D.

G, is the top or roof of the omnibus or stage. The case, it will be seen, is secured in the top or roof; the glass portion, A, extending downward into the interior of the omnibus or stage; the metal cap, B, being above the top or roof. A flanch, H, encircles the case, at the junction of the glass, A, and metal cap, B; the flanch, H, resting upon the top or roof, G, and securing the case in its proper position.

When the lamp is removed or adjusted in the socket, D, the metal cap, B, is thrown back, as represented by dotted lines in Fig. 2.

Thus it will be seen that, by this invention, the lamp, C, illuminates the interior of the omnibus or stage, and also affords light on the top or roof of the omnibus or stage, to enable the driver to see distinctly the money-box, as the lens, E, concentrates the rays of light; the money-box being so placed as to receive the rays of light concentrated by the lens.

Having thus described my invention, what I claim as new, and desire to secure by Letters Patent, is,

Constructing the case of the lamp, in the manner substantially as described, viz., the lower part, A, of the case, being constructed of glass, and the upper part, B, of metal, having a lens, E, inserted in it. By which construction the lamp, C, when placed as herein shown is made to illuminate the interior of the omnibus or stage and also to afford light on top or roof of the omnibus or stage, to enable the driver to see distinctly what money or tickets he may receive and to facilitate him in giving change.

F. O. DESCHAMPS.

Witnesses:
S. H. WALES,
E. C. POLKHAMUS.